United States Patent
Prociw

(10) Patent No.: US 8,912,984 B2
(45) Date of Patent: Dec. 16, 2014

(54) METHOD AND DEVICE FOR OVERLAPPING DISPLAY

(75) Inventor: Philip James Prociw, Waterloo (CA)

(73) Assignee: Blackberry Limited (CA)

( * ) Notice: Subject to any disclaimer, the term of this patent is extended or adjusted under 35 U.S.C. 154(b) by 110 days.

(21) Appl. No.: 13/249,411

(22) Filed: Sep. 30, 2011

(65) Prior Publication Data

US 2013/0083040 A1 Apr. 4, 2013

(51) Int. Cl.
*G09G 3/30* (2006.01)
*G09G 3/32* (2006.01)
*G06F 3/14* (2006.01)

(52) U.S. Cl.
CPC ........ *G09G 3/3208* (2013.01); *G09G 2300/023* (2013.01); *G06F 3/1438* (2013.01)
USPC .............................. 345/76; 345/82; 315/169.3

(58) Field of Classification Search
USPC .................... 345/4–6, 502, 76, 82; 315/169.3
See application file for complete search history.

(56) References Cited

U.S. PATENT DOCUMENTS

| | | | |
|---|---|---|---|
| 6,720,961 B2 | 4/2004 | Tracy | |
| 6,721,023 B1 | 4/2004 | Weiss et al. | |
| 6,906,762 B1 | 6/2005 | Witehira et al. | |
| 7,205,959 B2 | 4/2007 | Henriksson | |
| 7,362,046 B2 | 4/2008 | Aston | |
| 7,619,585 B2 | 11/2009 | Bell et al. | |
| 7,624,339 B1 | 11/2009 | Engel et al. | |
| 7,626,594 B1 | 12/2009 | Witehira et al. | |
| 2004/0252076 A1 | 12/2004 | Kodama | |
| 2006/0273983 A1 | 12/2006 | Koo et al. | |
| 2008/0192013 A1* | 8/2008 | Barrus et al. | 345/173 |
| 2009/0284532 A1* | 11/2009 | Kerr et al. | 345/442 |
| 2009/0295976 A1* | 12/2009 | Choi | 348/333.11 |
| 2010/0083192 A1* | 4/2010 | Zaman et al. | 715/866 |
| 2011/0164047 A1 | 7/2011 | Pance | |
| 2011/0175902 A1* | 7/2011 | Mahowald | 345/419 |

FOREIGN PATENT DOCUMENTS

EP 1212744 A1 3/2001

OTHER PUBLICATIONS

"European Application Serial No. 11183528.6, Extended Search Report mailed Feb. 15, 12", 6 pgs.
"Product Deployments", puredepth, [Online]. Retrieved from the Internet: <URL:www.puredepth.com/technology/Platform_hw.php?l=en>, (accessed Sep. 4, 2013), 2 pgs.
Peter, Mark, "Wide screen 30-Inch multi-layer display", LetsGoDigital, [Online]. Retrieved from the Internet: <URL: http://www.letsgodigital.org/en/news/articles/story_7395.html>, (Apr. 21, 2006), 2 pgs.

* cited by examiner

*Primary Examiner* — Abbas Abdulselam
*Assistant Examiner* — Steven Holton
(74) *Attorney, Agent, or Firm* — Schwegman Lundberg & Woessner, P.A.

(57) ABSTRACT

Embodiments of an apparatus for having overlapping displays and methods for operating such apparatus can provide enhanced display and operational capabilities. The overlapping displays may include multiple overlapping transparent displays. Embodiments of additional apparatus, systems, and methods are disclosed.

17 Claims, 5 Drawing Sheets

METHOD AND DEVICE FOR OVERLAPPING DISPLAY

TECHNICAL FIELD

Various embodiments described herein relate to apparatus and methods associated with displays.

BACKGROUND

In the field of image display devices there is a growing trend toward the use of higher resolution, complex images, and streaming video to create a rich visual experience for the user. These requirements are pushing the processing power demands for display devices beyond the limits of existing processors. In some situations this may result in streaming video appearing to skip, pause, or stutter. Additionally, users increasingly want display devices that are lighter and thinner and that consume less power.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Figure 1:
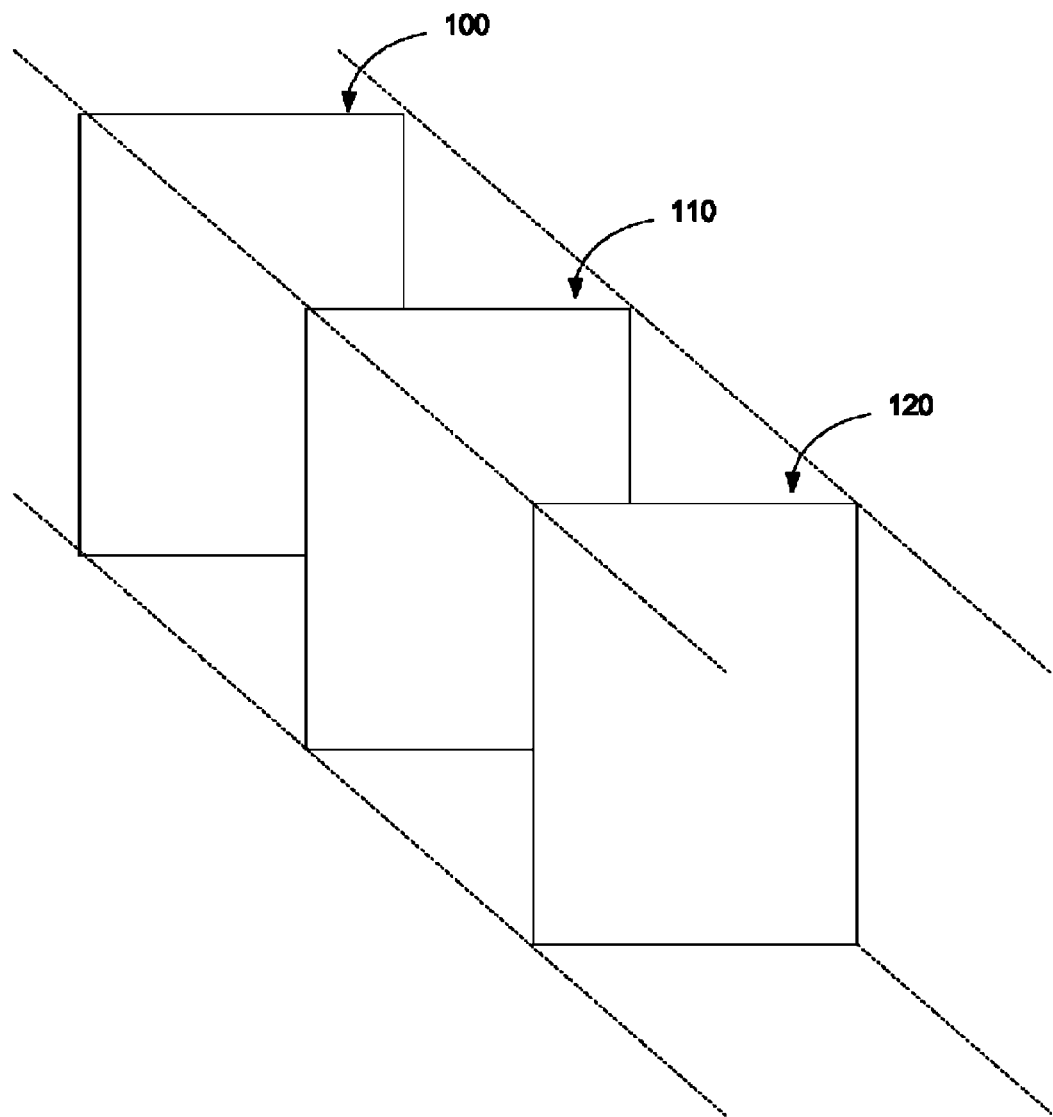
FIG. 1 illustrates overlapping displays in accordance with some embodiments.

FIG. 1 illustrates overlapping tangible displays in accordance with some embodiments. Displays 100, 110, and 120 may be organic light emitting diode (OLED) displays. A display 120 overlaps another display 110 when it is positioned in front of the other display such that it completely or partially obscures the other display (from the point of view of a user viewing the displays) unless it is transparent. In some embodiments, displays 100, 110 and 120 may be partially overlapping. In some embodiments, displays 100, 110 and 120 may be of different shapes or dimensions. In some embodiments, displays 100, 110 and 120 may be completely overlapping. Although three displays are presented for illustrative purposes, any number of displays may be employed. The displays may be selectively or entirely transparent. In some embodiments, an OLED display may overlap a liquid crystal display (LCD). In some embodiments, other transparent display technologies may be used, including, for example, thin-film and electro-luminescent displays.

OLED displays, which do not require backlighting, may be thinner than conventional displays, such as LCD's, and may require less power to operate in addition to being capable of being transparent.

In some embodiments, overlapping displays 100, 110, and 120 may be part of a portable electronic device such as a wireless communication device, a smart phone, a personal digital assistant (PDA), a laptop computer, a portable computer, a web tablet, a wireless telephone, a pager, an instant messaging device, a portable television, a portable DVD player, or a digital camera. Some portable electronic devices may be handheld, that is, sized to be held or carried in a human hand. In some embodiments, overlapping displays 100, 110, and 120 may be part of a GPS, a television, a computer monitor or other device that may display images including videos and other forms of information. In some embodiments, overlapping displays 100, 110 and 120 may be used in touch screen applications.

Figure 2:
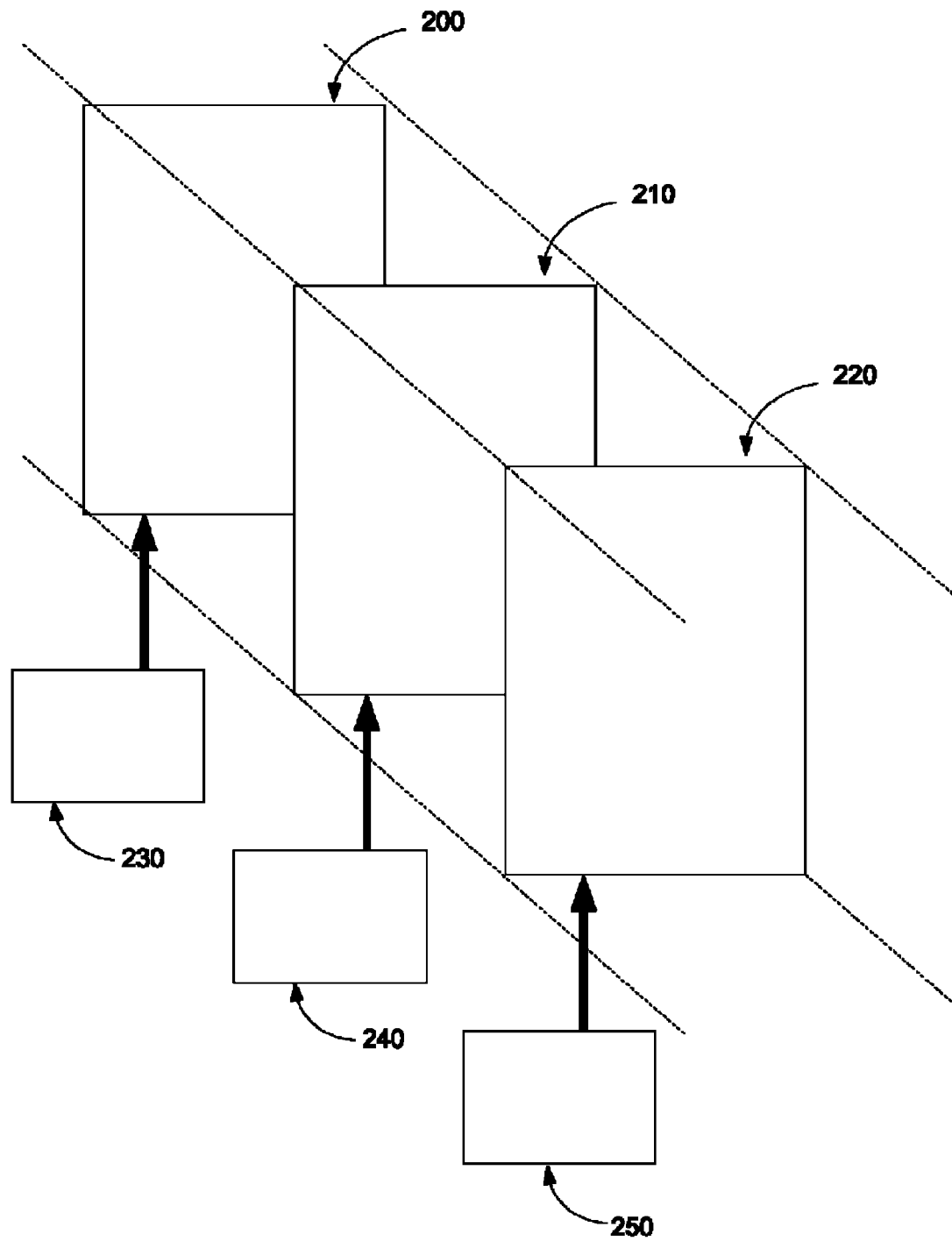
FIG. 2 illustrates overlapping displays and display processors in accordance with some embodiments.

FIG. 2 illustrates overlapping displays and display processors in accordance with some embodiments. Displays 200, 210, and 220 may each be controlled by separate processors 230, 240, and 250. In some embodiments, processors 230, 240, and 250 may be physical processors. In some embodiments, processors 230, 240, and 250 may be logical processors. Examples of logical processors may include multiple independent processes or threads running on a single physical processor. In some embodiments, processors 230, 240, and 250 may maintain synchronized clocks. To attain synchronization, one of the processors can provide a clock signal for use by the other processors. Alternatively, a separate clock module may provide a clock signal to be shared by the processors. Alternatively, the processors may periodically update their clocks based on a comparison with a master clock to maintain synchronization.

The processors may interact together, enabling one display to enhance another display, or the processors may operate independently. In some embodiments, the energy consumption of the displays may be independent of one another. In some embodiments, one or more processors may be specialized or high performance graphics processors that are suitable for handling complex images. Other processors may be less expensive processors that are suitable for handling simpler images. In some embodiments, the simpler images may be controlled by a general purpose processor of the device incorporating the overlapping displays.

Figure 3:
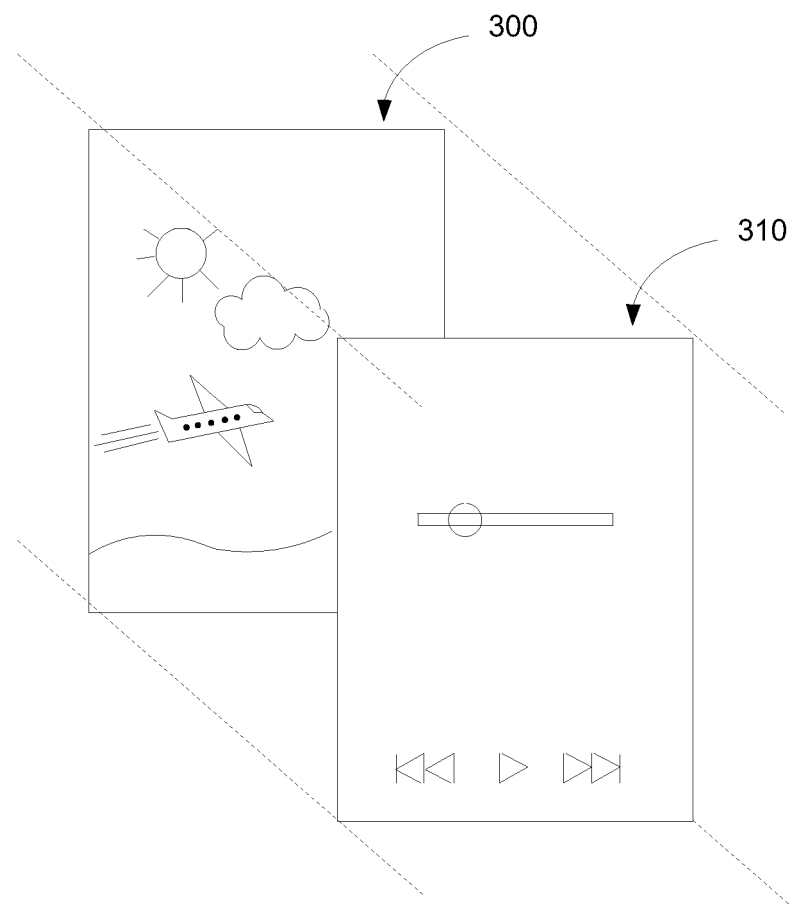
FIG. 3 illustrates overlapping display content in accordance with some embodiments.

FIG. 3 illustrates overlapping display content, or images, in accordance with some embodiments. Display 300 may be configured to display streaming videos and display 310 may be configured to display on-screen controls. As used herein, a component is generally "configured" to perform a function when the component is capable of carrying out the function.

Streaming videos may comprise a series of images, displayed at a rate sufficient to create a visual effect that simulates motion. In some embodiments, display 300 may display a background image, while display 310 may display a message, an e-mail or some other form of text. Display content may be separated so that complicated images may be processed and maintained on one display, while simple images may be processed and maintained on another display. Processing efficiencies may be realized in this manner, particularly when only the simple image is being updated. In such a case, the complex image, with its associated complex processing requirements, does not need to be redrawn since it is on a separate display.

In some embodiments, the controlling processors 230, 240, and 250 may permit an uninterrupted display of the streaming video 300, while the on-screen controls 310 are being manipulated. In many cases, an uninterrupted display will be a "normal" display (from the point of view of a viewer), typically without jerks or stoppages or loss of image quality or other artifacts. Since the processing tasks associated with the various displays may be distributed among the controlling processors, the processor handling the streaming video on a particular display may not be burdened or interrupted by the need to interlace the on-screen controls onto the same display when a request is made to pause, skip, seek or play. This capability may avoid degradation of the streaming video that may be exacerbated in other conventional approaches when users attempt to manipulate on-screen controls.

Figure 4:
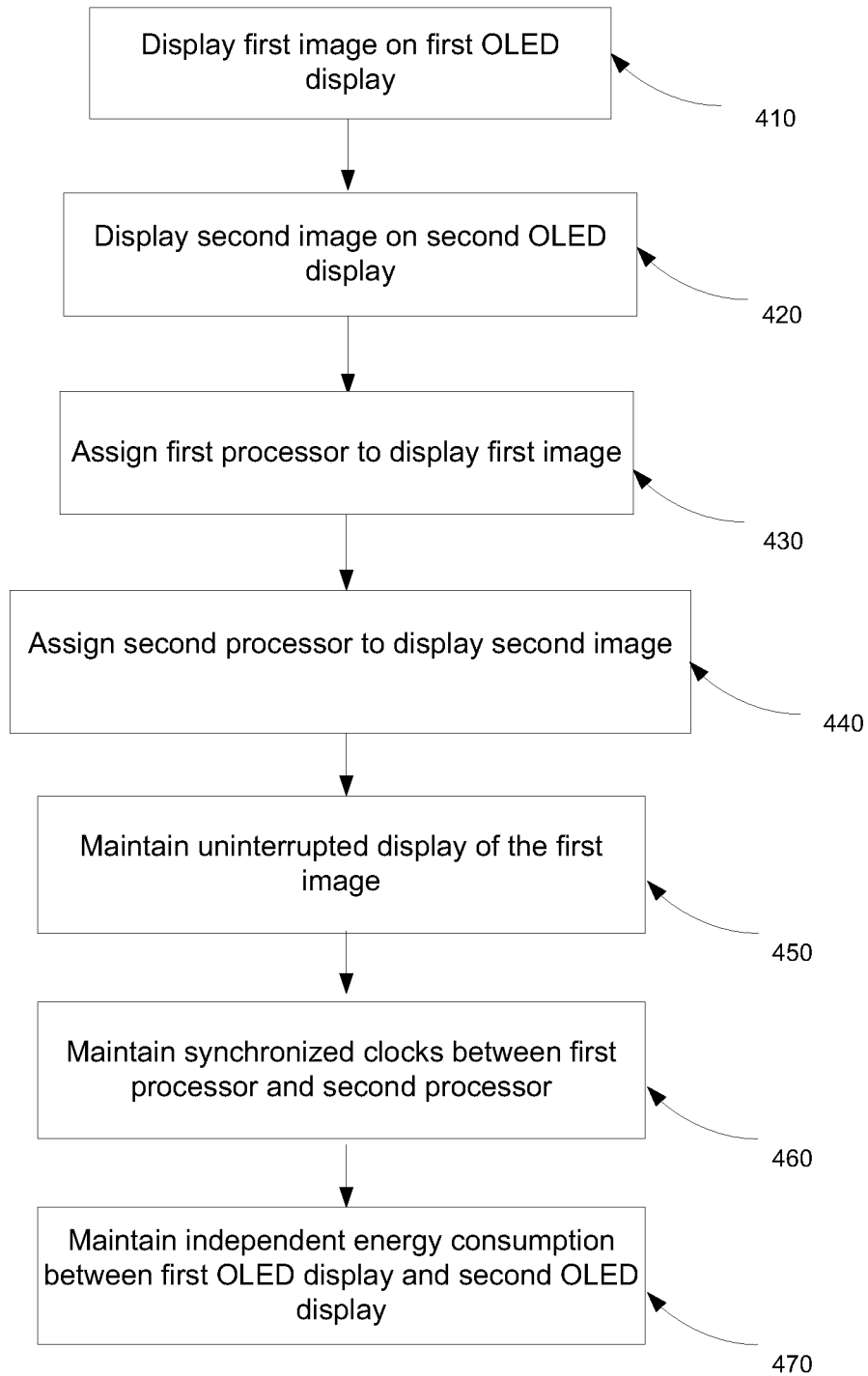
FIG. 4 illustrates a procedure for implementing overlapping displays in accordance with some embodiments.

FIG. 4 illustrates a procedure for implementing overlapping displays in accordance with some embodiments. In the example procedure of FIG. 4, it is assumed for simplicity that there are two displays and both are OLED displays. Operation 410 comprises displaying a first image on a first OLED display. Operation 420 comprises displaying a second image on a second OLED display. The second OLED display may partially or completely overlap the first OLED display and may be selectively transparent to the first OLED display. The ability to adjust (i.e., control) the opacity of the individual OLED displays allows for tinting effects that may help with visibility in different lighting conditions as well as security.

A variety of visual effects may be implemented with the overlapping displays. A transition effect may be created between a first image and a second image wherein the transition is a gradual changeover from one image to the other. The transition effect may comprise the fading out of a first OLED display and fading in of a second OLED display. In some embodiments, the fading in of the second OLED display may be simultaneous with the fading out of the first OLED display. In some embodiments, the first image may be associated with one application, while the second image may be associated with a different application. The first image may be optimized for work activities, while the second image may be optimized for other activities. In some embodiments the first image may be a background image and the second image may be a message, such as a text message. In some embodiments the background image may be an animation such as a changing wallpaper pattern or slideshow. A visual floating effect may be created between an image on the first OLED display and an image on the second OLED display by taking advantage of the physical spacing between the first and second OLED displays such that the second image appears to float above the first image by the distance of the physical spacing. Such an effect may create an added sense of realism and a more satisfying user experience without any additional requirement for processing power.

Operation 430 comprises assigning a first processor to display the first image. A processor—which may be a logical processor or a physical processor—is assigned when the processor is responsible for or controls the displaying of image or the manner in which the image is displayed (including, but not limited to, controlling the opacity of the image). The first image displayed (operation 420) may be (for example) a streaming video. Operation 430 comprises assigning a second processor to display the second image. The second image displayed (operation 440) may be (for example) a relatively static display of on-screen controls. Note that the operations shown in FIG. 4 need not always be carried out in the order shown. Operations 410 through 440, for example, may be performed in any order other than that shown.

Operation 450 comprises maintaining an uninterrupted display of the first image. In this example, maintain refers to maintaining video performance. The operation involves displaying both video content and video controls on separate displays to avoid impact to the video content playback performance. If carried out on a single display, there may be an impact to video performance when overlapping video controls onto video content. This involves additional processing, which may result in jitter/stutter/reduced frame rate if the processor is already struggling to display the video content alone. In a simple formula, this example recognizes that on a single display:

Total Processing Power=Processing Power to combine content and controls+Processing Power to display combined content.

And on multiple displays: Total Processing Power=Processing Power to display video content+Processing Power to display video control.

The Processing Power utilized on multiple displays may be significantly less than on a single display since the video controls are static (not a moving video), as opposed to the amount of post-processing required to the static image with the video.

Operation 460 comprises maintaining synchronized clocks between the first processor and the second processor. This may be accomplished wherein one of the processors provides a clock signal for use by the other processors. Alternatively, the processors may periodically update their clocks based on a comparison with a master clock to maintain synchronization.

Operation 470 comprises maintaining independent energy consumption between the first OLED display and the second OLED display. Independent energy consumption is maintained through the separation of display content onto different displays. If one display is an LCD display, and the other a transparent OLED, there exists a difference is power consumptions between one display and another (OLED having better power consumption). By separating content, a degree of optimization can be implemented to utilize the power consumption tradeoff based on content. LCD may hold visual/performance benefits over an OLED display that would make the use of a power-hungry display more favorable for certain applications. For some arrangements of overlapping displays, if only one is used to display content, the alternative displays may be "powered down," minimizing the power consumption.

Figure 5:
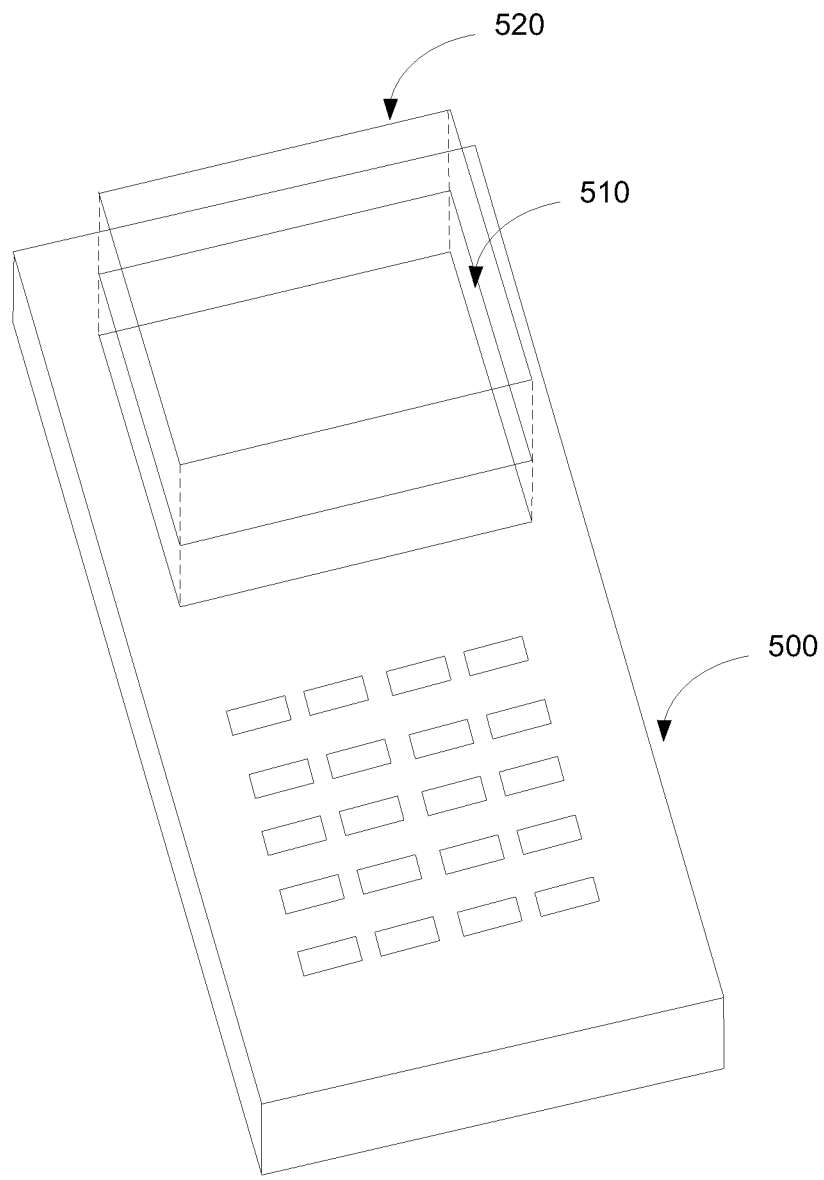
FIG. 5 illustrates overlapping displays implemented in a portable electronic device in accordance with some embodiments.

FIG. 5 illustrates overlapping displays implemented in a portable electronic device in accordance with some embodiments. Portable electronic device 500 may implement multiple overlapping displays 510 and 520. Displays 510 and 520 may be organic light emitting diode (OLED) displays. Although two displays are presented for illustrative purposes, any number of displays may be employed.

One or more of the embodiments of the concepts may realize one or more benefits, some of which have been mentioned already. Some embodiments may produce displays of images that are more aesthetically pleasing in one or more respects. For example, the display of one image (such as displaying an on-screen control) need not affect the fluidity or aesthetic appearance of another image. The absence of artifacts in one or more images may be less noticeable to a user (in comparison to artifacts that might be generated if a single processor controlled the displaying two or more images, which may be much more noticeable). Independent control of the images by independent processors, and their independent energy consumption, may result in more efficient energy usage. In the case of implementation in a handheld device, in which considerations of size and weight may be of importance, the concepts described herein can be implemented in a miniature display. The concepts herein may be further advantageous, however, in that they may be flexibly applied to devices having different purposes, sizes and shapes.

Embodiments may be implemented in one, or a combination, of hardware, firmware and software. Embodiments may be implemented as instructions stored on a machine-readable storage medium, which may be read and executed by at least one processor to perform the operations described herein. The machine-readable storage medium may be realized as a computer-readable storage medium. A machine-readable medium may include any tangible medium for storing in a form readable by a machine (e.g., a computer, a mobile wireless device that includes a controller or processor). For example, a machine-readable medium may include read-only memory (ROM), random-access memory (RAM), magnetic disk storage media, optical storage media, and flash-memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a portable electronic device comprising:
   displaying, via a first processor of the portable electronic device, a first image of video content on a first organic light emitting diode (OLED) display;
   displaying, via a second processor of the portable electronic device, a second image on a second OLED display, wherein the second OLED display overlaps the first OLED display and is selectively transparent to the first OLED display, wherein the first and second OLED displays operate independently from each other;
   controlling the displaying of the first image on the first OLED display with the first processor; and
   controlling the displaying of the second image on the second OLED display with the second processor;
   wherein the first and second processors operate independently and consume energy independently from each other and from the first and second OLED displays;
   wherein the first image displayed on the first OLED display is provided from a first software application and the second image displayed on the second OLED display is provided from a second software application, wherein the first and second software applications are different;
   wherein the second image displayed on the second OLED display provides a user interactive on-screen control and is configured to receive a user command, communicate the user command from the second software application to the first software application, and cause the first software application to affect playback of the video content displayed on the first OLED display; and
   wherein displaying the user interactive on-screen control does not affect displaying the video content on the first OLED display, such that processing power from the first processor used for displaying the video content on the first OLED display is not affected by the processing power from the second processor used for displaying the user interactive on-screen control on the second OLED display.

2. The method of claim 1, wherein the first processor is a physical processor specialized for graphics processing and the second processor is a logical processor operating on a general purpose processor.

3. The method of claim 1, wherein the first image is a portion of a streaming video and the second image is a user-interactive on-screen control configured for display during playback of the streaming video.

4. The method of claim 3, further comprising maintaining an uninterrupted display of the streaming video during display of the user interactive on-screen control.

5. The method of claim 1, further comprising maintaining synchronized clocks in the first and second processors to coordinate display of the first image of the video content with the second image providing the interactive on-screen control.

6. The method of claim 1, further comprising displaying a transition between the first image and the second image, wherein the first OLED display fades out the first image and the second OLED display fades in the second image.

7. The method of claim 1, further comprising adjusting opacity of the second OLED display.

8. A device comprising:
   a first organic light emitting diode (OLED) display;
   a second OLED display, wherein the second OLED display overlaps the first OLED display and is selectively transparent to the first OLED display, wherein the first and second OLED displays operate independently from each other;
   a first processor to output and control display of a first image of a series of images from video content on the first OLED display; and
   a second processor to output and control display of a second image on the second OLED display;
   wherein the first and second processors operate independently and consume energy independently from each other and from the first and second OLED displays;
   wherein the first image displayed on the first OLED display is provided from a first software application and the second image displayed on the second OLED display is provided from a second software application, wherein the first and second software applications are different;
   wherein the second image when displayed on the second OLED display provides a user interactive on-screen control that is configured to receive a user command, communicate the user command from the second software application to the first software application, and cause the first software application to affect playback of the video content when displayed on the first OLED display; and
   wherein display of the user interactive on-screen control does not affect displaying the series of images displayed on the first OLED display, and wherein processing power from the first processor used for displaying the series of images on the first OLED display is not affected by the processing power from the second processor used for displaying the user interactive on-screen control on the second OLED display.

9. The device of claim 8, wherein the first processor is a physical processor specialized for graphics processing and the second processor is a logical processor operating on a general purpose processor.

10. The device of claim 8, wherein the first processor is configured to display the first image during playback from streaming video of the series of images and the second processor is configured to manage on-screen controls as the second image for display during playback of the streaming video.

11. The device of claim 8, wherein the first processor and the second processor maintain synchronized clocks to coordinate display of the first image of the series of images with the second image that provides the user interactive on-screen control.

12. The device of claim 8, wherein opacity of the second OLED display is controlled by the second processor.

13. The device of claim 8, wherein the device is a portable electronic device.

14. A non-transitory machine readable storage medium storing a set of instructions that, when executed by a machine, cause the machine to:
- display, using a first processor of the machine, a first image of a series of images on a first organic light emitting diode (OLED) display;
- display, using a second processor of the machine, a second image on a second OLED display, wherein the second OLED display overlaps the first OLED display and is selectively transparent to the first OLED display, wherein the first and second OLED displays operate independently from each other;
- utilize the first processor to generate output and control the displaying of the first image on the first OLED display; and
- utilize the second processor to generate output and control the displaying of the second image on the second OLED display;
- wherein the first and second processors operate independently and consume energy independently from each other and from the first and second OLED displays;
- wherein the first image displayed on the first OLED display is provided from a first software application and the second image displayed on the second OLED display is provided from a second software application, wherein the first and second software applications are different;
- wherein the second image displayed on the second OLED display provides a user interactive on-screen control and is configured to receive a user command, communicate the user command from the second software application to the first software application, and cause the first software application to affect playback of the video content displayed on the first OLED display; and
- wherein operations to display the user interactive on-screen control do not affect operations to display the video content on the first OLED display, such that processing power from the first processor used for displaying the video content on the first OLED display is not affected by the processing power from the second processor used for displaying the user interactive on-screen control on the second OLED display.

15. The machine readable medium of claim 14, wherein the first image is provided from a streaming video of the series of images and the second image is a user-interactive on-screen control configured for display during playback of the streaming video.

16. The machine readable medium of claim 14, wherein the instructions include instructions that, when executed by the machine, cause the machine to display a transition between the first image and the second image such that the first OLED display fades out the first image and the second OLED display fades in the second image.

17. The machine readable medium of claim 14, wherein the instructions include instructions that, when executed by the machine, cause the machine to adjust opacity of the second OLED display.

* * * * *